United States Patent [19]

Hall

[11] 4,398,586
[45] Aug. 16, 1983

[54] DEMOUNTABLE VEHICLE WINDOW SCREEN

[76] Inventor: James Hall, 2727 N St. SE., Washington, D.C. 20019

[21] Appl. No.: 239,659

[22] Filed: Mar. 2, 1981

[51] Int. Cl.³ .............................................. E06B 9/00
[52] U.S. Cl. .................................. 160/105; 160/354; 160/368 R
[58] Field of Search ................... 160/105, 354, 368 R, 160/379, 381

[56] References Cited

U.S. PATENT DOCUMENTS

| | | | |
|---|---|---|---|
| 1,757,896 | 5/1930 | Baron | 160/105 |
| 2,101,349 | 12/1937 | Shapp | 160/381 |
| 2,722,978 | 11/1955 | Frisk | 160/105 |
| 2,760,568 | 8/1956 | Smiraldo | 160/105 |
| 2,762,430 | 9/1956 | Sylvan | 160/379 |
| 2,869,634 | 1/1959 | Bourgoin | 160/105 |
| 2,873,800 | 2/1959 | Kogan | 160/105 |
| 2,881,831 | 4/1959 | Knodel, Jr. | 160/105 |
| 2,914,123 | 11/1959 | Deuble | 160/105 |
| 3,022,872 | 2/1962 | Fitzgerald | 160/381 |
| 3,422,876 | 1/1969 | Fester | 160/105 |
| 3,753,458 | 8/1973 | Lazarek | 160/354 |
| 4,068,428 | 1/1978 | Peterson | 160/354 |
| 4,285,383 | 8/1981 | Steenburgh | 160/105 |

Primary Examiner—Peter M. Caun
Attorney, Agent, or Firm—Lowe, King, Price & Becker

[57] ABSTRACT

A demountable screen for a vehicle window includes a first rigid frame dimensioned substantially the same as a peripheral portion of an opening defining the window. A channel-shaped track guide is attached in overlapping relation to the width of strips that define the periphery of the frame. The strips define a recessed area extending lengthwise along a portion of the frame. Screen material, carried by and extending between strips of the first frame, define screened and unscreened portions. A second rigid frame, carried by the channel and dimensioned so it can slide within the channel, carries screen material to enable the unscreened portion to be selectively covered and uncovered. Barbed fastening means having a plurality of resiliently deformable projections is secured projecting outwardly from a surface, including the recessed area, of the first frame. These projections are adapted to mate with corresponding loop-like deformable projections secured to the peripheral portion of the access opening, attaching the demountable screen to cover the vehicle access opening.

6 Claims, 6 Drawing Figures

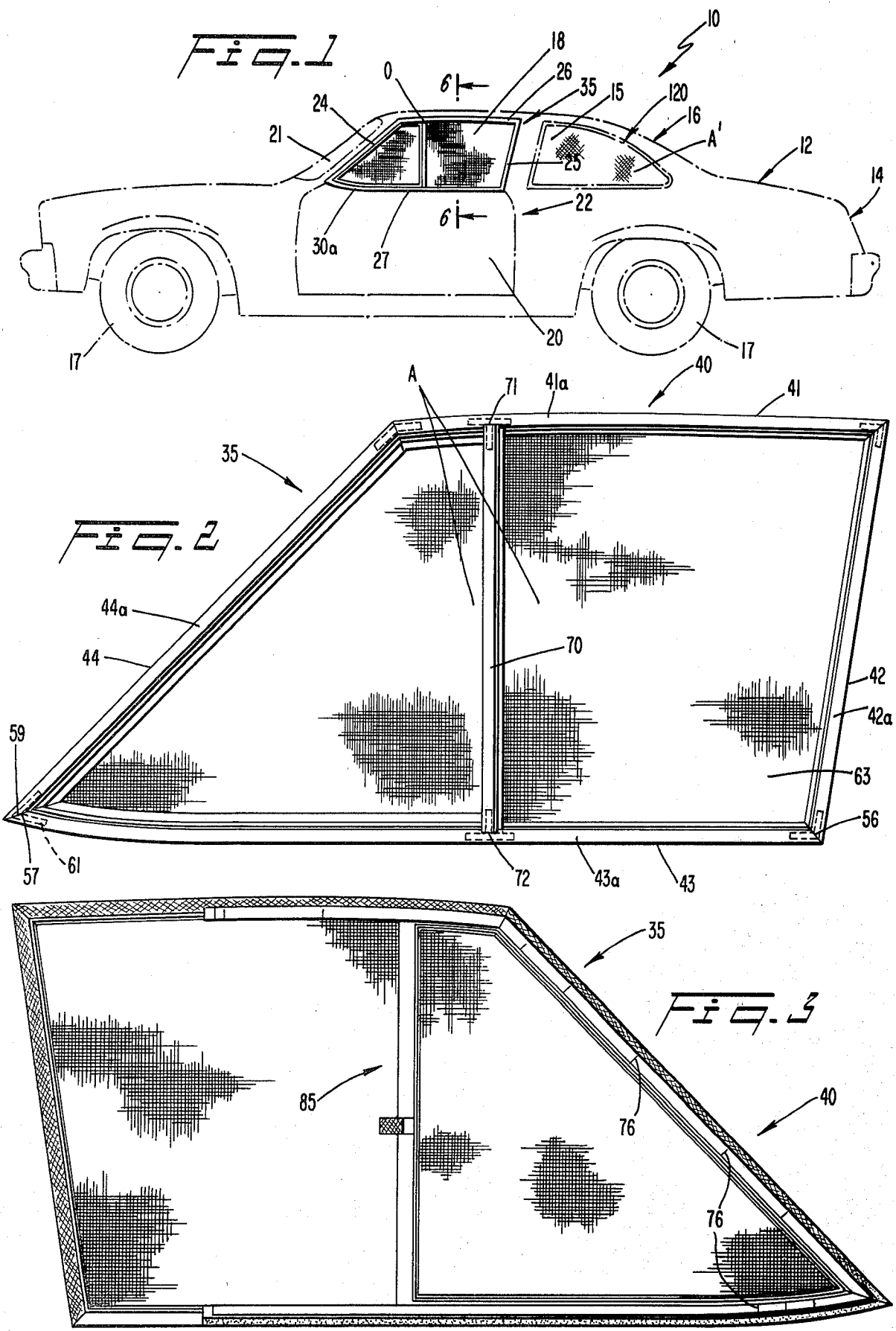

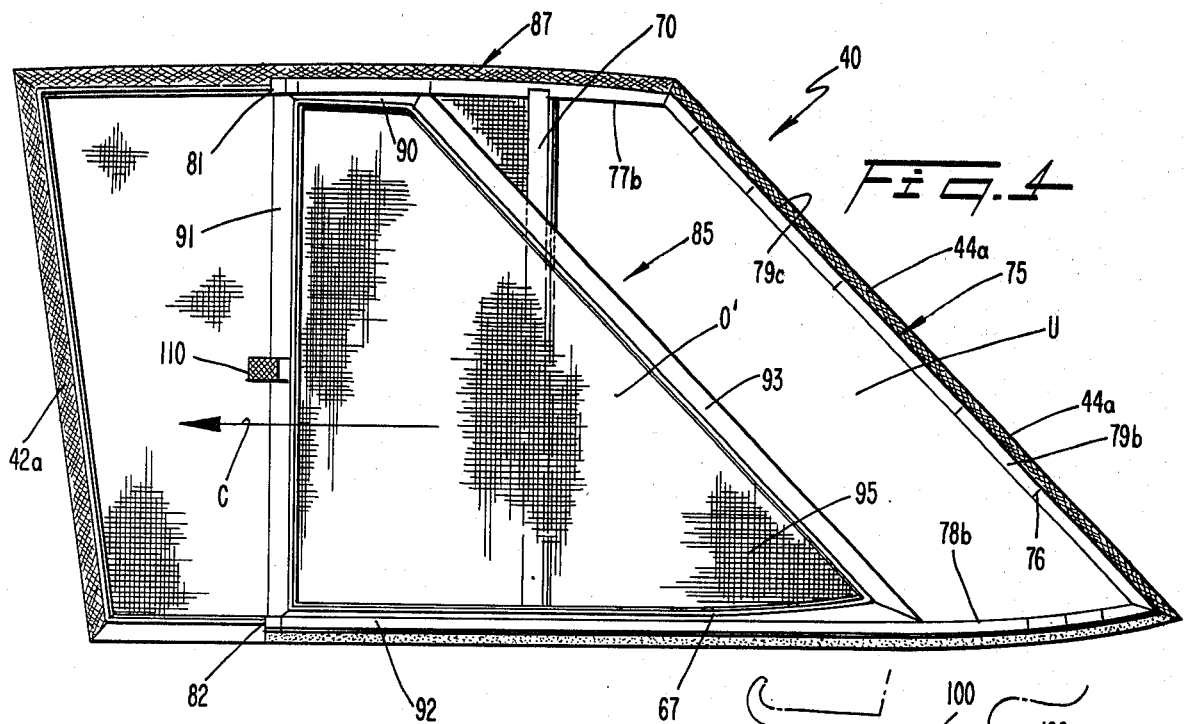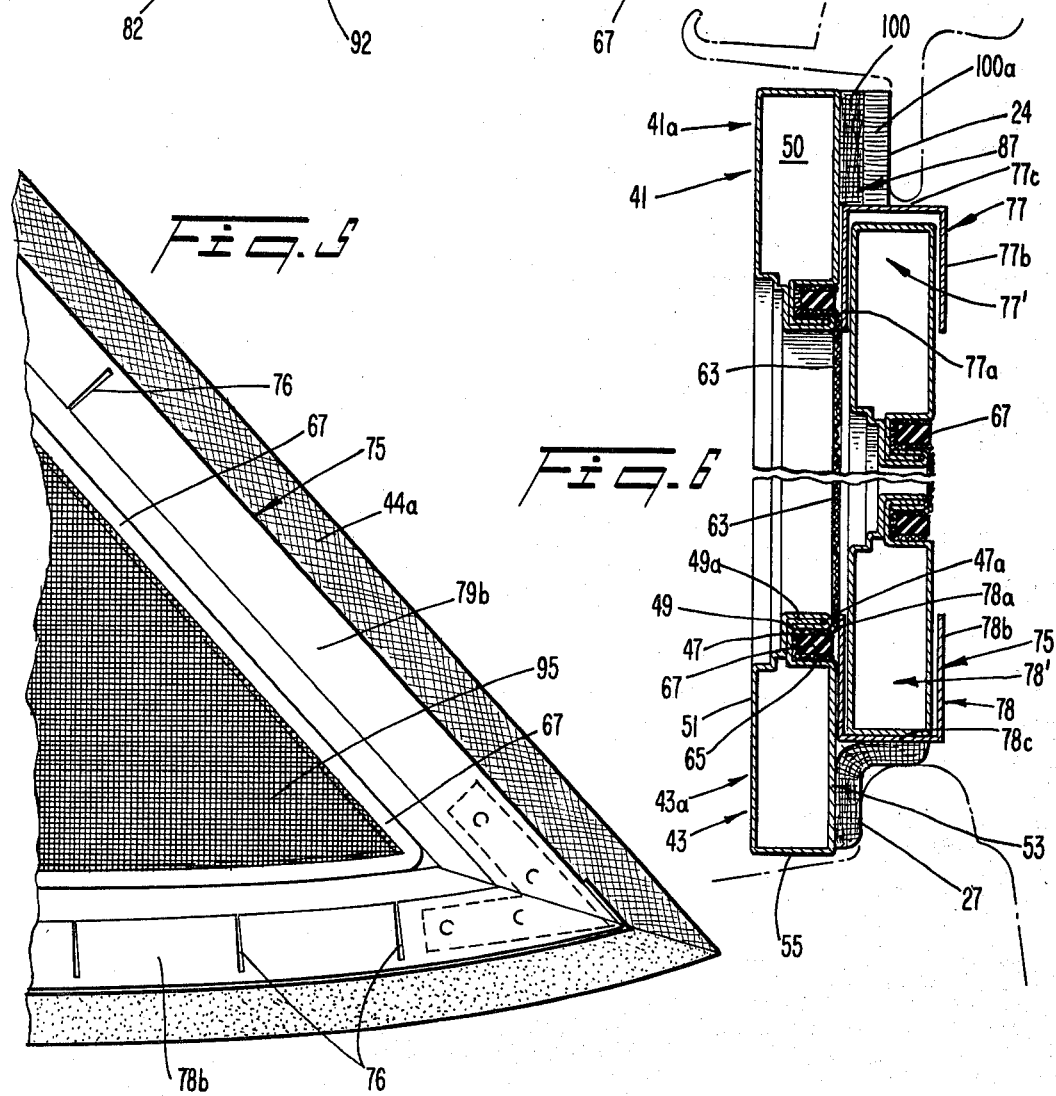

DEMOUNTABLE VEHICLE WINDOW SCREEN

TECHNICAL FIELD

The present invention relates generally to vehicle window screens and more particularly, to demountable vehicle window screens having a rigid frame carrying barbed fastening means for securing the frame to the vehicle window.

BACKGROUND ART

Vehicle window screens have been proposed for use during warm weather to protect passengers from bothersome insects in parked vehicles, while permitting fresh air to circulate within the vehicle interior. Such screens have been proposed for use at drive-in theaters, and by persons who wish to sleep in their vehicles during hunting or camping trips. In U.S. Pat. No. 3,960,195 to Marchbanks, for example, there is disclosed a ventilation screen that is installed in a window opening by fastening one side of a zipper fixedly attached to the screen edge, to a second side of the zipper connected to a vehicle structure defining the window opening. The screen is demountable by sliding the zipper in unlocking direction.

In U.S. Pat. No. 3,753,458 to Lazarek, there is disclosed a demountable automobile window screen including a sheet of screening having the same shape as the car window. The screen is secured to the automobile by strips of male and female Velcro. The Velcro strips are respectively mounted to a border of the screen and around the window so they abut each other while the screen is in situ over the window opening.

The prior art automobile window screens of which I am aware generally lack rigidity, and proper alignment of the portions surrounding the car window would often appear difficult. Furthermore, zippers employed in some prior art screens may sometimes stick, rendering the screen inoperative or undetachable from the window without damaging the screen. It is desirable to have a screen capable of overcoming these problems.

It is often desirable to use a window screen in a moving vehicle. For example, such screen use often minimizes the propensity to throw litter out of the vehicle. In addition, a window screen may often prevent stones and other debris picked up by truck tires and other heavy load vehicles from entering the passenger compartment and causing damage to passengers and property within the compartment. In city driving, a vehicle window screen may provide additional security against unauthorized intruders that sometimes approach passengers stopped, for example, at a red light. Indirectly, vehicle window screen use for the above reasons may tend to conserve fuel, because drivers who customarily rely upon air conditioning may instead open their windows to obtain fresh air.

Another problem associated with the above prior art vehicle window screens occurs when a vehicle occupant wants to or is required to reach from the vehicle interior to a region immediately exterior the vehicle window opening (e.g., at pay tolls, picking up garage tickets, paying parking fees, and hand signalling). In the prior art devices of which I am aware, the occupant must generally remove the entire screen to reach from the interior to the exterior of the vehicle. One attempt to solve this problem is disclosed in the prior U.S. Pat. No. 2,650,858 to Lange, wherein a sliding window screen is retained within a guide channel in the vehicle door, and raised or lowered by hand cranking. Such a screen permits physical communication through the window opening; however, the screen must first be lowered by hand cranking, often a tedious process, particularly for elderly drivers. In addition, higher manufacturing costs are incurred in constructing the channel and cranking means.

It is accordingly an object of the present invention to provide a new and improved vehicle screen that is easily mountable and demountable in position covering a vehicle window opening.

Another object of the invention is to provide a demountable vehicle window screen having reliable attachment means for securing the demountable screen against the peripheral portions of a vehicle window opening.

Yet another object is to provide a new and improved demountable vehicle screen permitting occupants to reach through the window opening while the screen is in position against the opening.

Still another object is to provide a demountable screen capable of preventing insects or other unauthorized intruders from entering the vehicle cabin interior.

Another object of the present invention is to provide a demountable screen which may be purchased apart from a vehicle, and easily installed.

DISCLOSURE OF INVENTION

A demountable screen, in accordance with the present invention, comprises a rigid frame having dimensions substantially the same as the dimensions of a vehicle portion surrounding a window access opening. Screen material is carried by the frame to cover the opening. To secure the demountable screen to the vehicle, barbed fastening means having a plurality of resiliently deformable projections is secured to the frame so the fastening means projects outwardly from the frame to mate with a plurality of resiliently deformable corresponding female projections attached to the peripheral portion of the window opening.

A demountable screen enabling a passenger to reach through the window opening, comprises a first rigid frame dimensioned substantially the same as the peripheral portions surrounding the window opening. Screen material carried by a portion of the first frame defines a screened and unscreened portion between the frame members.

Track guide means carried by the frame, is preferably formed as a channel shaped member preferably attached to a portion of the surface of the first frame, retains a second rigid frame within the channel. Preferably, the track guide partially overlaps the first frame surface to form a peripherally extending slot between the first frame and the track guide, enabling the track guide and second frame to be carried by the first frame within the window opening. Screen material, dimensioned to cover the unscreened portion, is carried by the second frame. Smooth sliding movement of the second frame within the track guide enables selective covering and uncovering of the unscreened portion permitting an occupant to reach through the window opening. Fastening means secures the first frame to the peripheral portions of the window opening.

The above and still further objects, features and advantages of the present invention will become apparent upon consideration of the following detailed description of the preferred embodiment thereof, especially when taken in conjunction with the accompanying drawing.

BRIEF DESCRIPTION OF DRAWING

FIG. 1 is a side view of an automotive vehicle employing the demountable window screen of the present invention in position covering a vehicle window opening;

FIG. 2 is an enlarged front plan view of a preferred embodiment of the demountable vehicle window screen shown in FIG. 1;

FIG. 3 is an enlarged rear plan view of the screen shown in FIG. 2, with the sliding screen portion in closed position;

FIG. 4 is a view similar to that of FIG. 3 with the sliding screen portion in fully open position;

FIG. 5 is an enlarged detailed view illustrating the connection of abutting strips of the frame; and FIG. 6 is an enlarged, sectional view, taken along the line 6—6 of FIG. 1, of a track guide means carried by the frame.

BEST MODE FOR CARRYING OUT THE INVENTION

FIG. 1 is an illustration of a two door automotive passenger vehicle 10 having an exterior chassis body 12. Chassis 12 includes main and upper body portions 14, 16 respectively, wherein main body 14 covers vehicle 10 from front to rear and upper body portion 16 defines an upper part of interior passenger cabin 15. Cabin 15 extends transversely between side portions of chassis 12 and longitudinally between front and rear wheels 17. Windows are carried in window openings O formed within upper body portion 16, enabling the driver and passengers to see outside of cabin 15. In the two-door model vehicle 10 shown in FIG. 1, front side window 18 is carried by guide channels (not shown) formed within a window frame (not shown in detail) attached to rectangular shaped lower door panel 20 of front side door 22. The window frame defining window opening O, comprises two substantially straight, vertically disposed elongated members projecting upwardly from front and rear portions of lower door panel 20, and a horizontally disposed elongated member interconnecting the upper ends of these vertical members. The upper horizontally disposed edge of door panel 20 defines the bottom edge of the window frame. The front vertically disposed member projects upwardly at an angle corresponding to the angle front windshield 21 forms with the horizontal plane. Elongated weather stripping elements 24, 25 respectively cover the front and rear vertically disposed window frame members, so the ends of these elements abut the ends of horizontally disposed weather stripping elements 26, 27 respectively covering the top and bottom frame portions. Elements 24–27 together define elongated peripheral portions of window opening O.

A demountable vehicle window screen 35 carrying screening material 63 is adapted for attachment to elements 24–27, in a manner described below, to substantially cover window opening O, and includes a first rigid frame 40 having a plurality of rectangular elongated strips 41–44. Each of strips 41–44 has a length substantially the same as the length of corresponding peripheral portions 24–27 (FIGS. 2 and 6), for ensuring proper covering of the window opening O when demountable screen 35 is used. As shown in FIG. 6, each strip 41–44 is bent to double thickness to form frame members 41a–44a resistant to bending that is likely to occur in normal handling of first rigid frame 40. To form the double thickness, lengthwise edge portions 47, 49 of each strip 41–45 are attached together by forming edge portion 47 into a U-shaped slotted portion 47a that receives locking tongue 49a of edge portion 49 in flip-fitting engagement. In this manner, each of elongated strips 41–44 forms frame members 41a–44a of first rigid frame 40. Each of frame members 41a–44a includes corresponding rectangular shaped elongated parallel side walls 51, 53, spaced apart from each other by bottom wall 55 integrally joining the side walls. Each of frame members 41a–44a has the same length as strips 41–44 corresponding to the length of peripheral stripping portions 24–27. In addition, the height of side wall 53 must be sufficient to vertically overlap with and carry second rigid frame 85 (described infra) and further overlap with peripheral portions 24–27 when positioned against window opening O in the manner described below.

As shown in FIG. 6, each frame member 41a–44a includes slot 50 formed between side walls 51, 53. Slot 50 extends through the length of each member and terminates in rectangular slotted portions 56 at opposite ends of the frame member. As shown in FIG. 2, abutting ends 57, 59 of adjacently positioned frame members are secured together by angled brackets 61 inserted into slotted portions 56 in tight fitting engagement. Ends 57, 59 and angled brackets 61 are suitably formed at an angle enabling frame members 41a–44a to follow the contour of window opening O, as defined by peripheral stripping portions 24–27, when assembled as first frame 40. In addition, frame members 41a–44a are preferably constructed from a light weight, rust resistant material, such as aluminum or plastic. Thusly formed, first rigid frame 40 is rugged and lightweight in design and capable of easy alignment over window opening O.

As shown in FIG. 2, first rigid frame 40 defines an opening A between frame members 41a–44a, which opening has a shape geometrically similar to and slightly larger than that of window opening O. Screen material 63 is carried by horizontally disposed frame members 41a, 43a and vertically disposed rear frame member 42a by fitting the edges of the screen material within slot 65. As shown in FIG. 6, slot 65 is formed during bending of lengthwise edge portion 49 into locking tongue 49a, so it is located between the locking tongue and side wall 53 to extend the length of frame members 41a–44a. Slot 65 is open in a direction toward side walls 53. Gasket strip 67 is positioned within each slot 65 to secure the edges of screen material 63 to the frame members. Elongated strut member 70, formed in a manner similar to fabrication of frame members 41a–44a, is positioned vertically between horizontal frame members 41a, 43a by securing the ends of the strut members within notches 71, 72 formed respectively in the horizontal frame members. Elongated strut member 70 retains an edge of screen 63 not retained by frame members 41a–43a to provide additional structural rigidity of first frame 40. Thusly secured within first frame 40, screen 63 defines a screened portion and an unscreened portion U within opening A of first frame 40.

To provide selective covering and uncovering of unscreened portion U, track guide means 75 comprises rectangular shaped elongated guide strip members 77–79. Each guide strip 77–79 is formed to define a U-shaped slot 77'–79' having a rectangular cross section (FIG. 6) that extends the length of each strip between parallel side walls 77a,b–79a,b and bottom edge portions 77c–79c, respectively, integrally joining the side walls. As best shown in FIG. 6, side walls 77a, 78a are fixedly attached lengthwise to portions of side walls 53 of horizontally disposed top and bottom frame members 41a, 43a, such that the open portion of slots 77'–79' face each other in a plane parallel to opening A of first rigid frame 40. Side wall 79a of strip 79 is similarly attached to front frame member 44a such that slot 79' (not shown in detail) communicates fully with slots 77', 78'. Slots 77', 78' are respectively closed off at ends 81, 82 of strip members 77, 78 with a piece of material shaped similar to the cross-section of the slots to prevent second rigid frame 85 from disengaging track guide means 75 during opening movement, as discussed below. Adhesive means, in the preferred embodiment Carpetape, attaches guide strips 77–79 to respective frame members 41a, 43a, 44a. Side walls 77a–79a are attached in overlapping relation to the width of the side wall 53 inwardly from bottom wall 55 to form a peripherally extending recess 87 (FIGS. 4 and 6) between portions of side walls 53 and bottom edge portions 77c–79c. Recess 87 extends lengthwise and adjacent guide strips 77–79 enabling second rigid frame 85, carried within track guide means 75, to be positioned within window opening O and first rigid frame 40 to be securely attached to peripheral stripping portions 24–27 of the window opening.

For selective covering and uncovering of unscreened portion U (FIG. 4), second rigid frame 85 comprises rectangular shaped elongated strip members 90–93, formed and attached together in a manner similar to the construction of first rigid frame 40 (see above description). Second frame 85 is dimensioned for retention and sliding movement within slots 77'–79' in a plane parallel to unscreened portion U. Frame strips 90–93 are further dimensioned to define an opening O' that is slightly larger than unscreened portion U so that screen material 95 carried by the second frame strips will substantially cover unscreened portion U when positioned opposite the unscreened portion. Second rigid frame 85 is capable of smooth sliding movement for selective positioning in relation to unscreened portion U; the maximum opening of the second rigid frame as it slides is controlled by ends 81, 82. Such controlled movement is necessary to reflect the design contour of peripheral stripping portions 24–27, which generally includes curved portions, such as forward portion 30a of peripheral stripping 27 in FIG. 1. Where second rigid frame 85 is formed to substantially define opening O' corresponding to unscreened portion U, the described design contour sometimes limits the length of travel of the second frame 85, to prevent vertical separation between the second frame and track guide means 75 that could result in possible disengagement with the track as the frame is moved open. In addition, notches 76 are formed in guide strips 77–79 enabling the track guide means 75 to approximate the design contour.

To secure demountable vehicle window screen 40 to cover access opening O selectively, fastening means is provided for attaching first rigid frame 40 to peripheral portions 24–27 of the access opening. Preferably, such fastening means includes a plurality of resiliently deformable barbed projections 100 secured to the surfaces of side walls 53 facing in the direction of peripheral portions 24–27 (FIG. 6). Such fastening means is also disposed within recess 87. Resiliently deformable looped projections 100a are correspondingly attached to peripheral portions 24–27, enabling easy alignment and excellent attaching conditions of the demountable screen with the peripheral portions to cover window opening O. Such fastening means are preferably male and female Velcro strips secured to the side wall 53 surfaces and peripheral portions 24–27. The full advantage of the present invention may be best realized by considering the operation of demountable vehicle screen 35. As shown in closed position in FIG. 3, first rigid frame 40 is a self-contained unit carrying second frame 85 within guide strips 77–79. When screen 35 is to be used, the user aligns first frame 40 with vehicle structure peripheral portions 24–27 surrounding access opening O and presses the frame into secured attachment as described supra. When second frame 85 is in fully closed position, access opening A is completely screened for the purposes set forth above. Should the driver desire to reach through access opening A, as shown in FIG. 4, tab 110 is pulled rearward, sliding second frame 85 in the direction of arrow C. Tab 110 is preferably formed of Velcro and secured to rear frame strip 91. Because of slots 77'–79', smooth sliding movement of second frame 85 is obtained. As shown in FIG. 6, recess 87 permits track guide means 75 carrying second frame 85 to reside within access opening O, thereby allowing full attachment between first frame 40 and peripheral portions 24–27. Because second frame 85 projects outwardly from first frame 40 toward window opening O in attached position, bottom edge portions 77c–79c, defining the width of slots 77'–79' and extending toward car window 18, must be dimensioned to avoid interference with the normal operation of the car window.

While there has been described and illustrated a specific preferred embodiment of the invention, it will be clear that variations in the details of the embodiments specifically illustrated and described may be made without departing from the true spirit and scope of the invention as defined in the appended claims. For example, a sliding screen constructed in the aforesaid manner may be deemed unnecessary to cover vehicle passenger windows. In this regard, screen material may be carried by a first rigid frame 120 fully covering rear window opening A'. Because of the frame rigidity, mounting and demounting of the car screen are easily obtained.

I claim:

1. A detachable screen for covering a vehicle access opening communicating with an interior passenger cabin, said screen having an aperture and carrying a sliding screen portion for selectively covering and uncovering said aperture, comprising:

(a) a first rigid frame having top and bottom curvilinear members and a side curvilinear member respectively dimensioned to engage and cover weather stripping elements surrounding said window opening;

(b) a track guide having upper and lower, U-shaped channel members each having parallel side walls and a bottom wall defining a track therebetween, one of said side walls being attached in vertical partially overlapping position in relation to the height of said first frame members on the inner side thereof, said track guides thereby projecting in the direction of the cabin and longitudinally along said top and bottom first frame members to define recessed areas extending lengthwise along a portion of said first frame members respectively, said recessed areas being located between an outer surface of the channel bottom wall and an edge of the top and bottom first frame members, said track guide being dimensioned to locate the recessed area in engagement with said weather stripping elements outside the vehicle window opening;

(c) screen material carried by and intermediate a portion of the first frame, defining a screened portion and unscreened portion intermediate said first frame;

(d) a second rigid frame having similar curvilinear members as said first frame, said second frame dimensioned for retention and sliding movement within said track guides so that each track receives entirely therein a corresponding edge of the second frame enabling the second frame to be entirely disposed within the plane defined between the upper and lower channel members, said second frame and channel members projecting towards the cabin from said first frame toward said vehicle window opening;

(e) screen material carried by and intermediate the second rigid frame, dimensioned to substantially cover the unscreened portion when positioned oppositely said unscreened portion; and (f) barbed fastening means having a plurality of resiliently deformable projections secured to and projecting outwardly from a surface including the recessed area of said first frame, said projections adapted for mating with a plurality of resiliently deformable corresponding projections secured to the weather stripping elements of said access opening, thereby enabling easy attachment of said detachable frame to substantially cover said vehicle opening by aligning said recessed areas with said weather stripping elements and by pressing the recessed areas into flush contact with the weather stripping elements.

2. A detachable screen according to claim 1, wherein said screen material carried by the second rigid frame is dimensioned to substantially cover the unscreened portion when positioned adjacent said unscreened portion.

3. A screen according to claim 1, further comprising a plurality of attachment clips, each of said clips engaging an end of said curvilinear members for slip fitting said members together forming the first frame.

4. A screen according to claim 1, further comprising a curvilinear strut member carried by and intermediate the first frame for strengthening said detachable screen, wherein the ends of the said strut member are retained within notches formed in the first frame.

5. A screen according to claim 1, wherein said track members include a plurality of transverse cuts for shaping said track members to correspond to the shape of said peripheral portion surrounding said access opening.

6. A screen according to claim 1, wherein said track guide includes curved channel members corresponding to a curved shape of the weather stripping elements, and stop means provided in the channel members for limiting the travel distance of the second frame along the first frame, said stop means preventing disengagement of the second frame from the channel members.

* * * * *